United States Patent
Gunner et al.

(10) Patent No.: US 10,781,846 B2
(45) Date of Patent: Sep. 22, 2020

(54) 3-D-PRINTED COMPONENTS INCLUDING FASTENERS AND METHODS FOR PRODUCING SAME

(71) Applicant: DIVERGENT TECHNOLOGIES, INC., Los Angeles, CA (US)

(72) Inventors: Jon Paul Gunner, Palos Verdes Estates, CA (US); John Russell Bucknell, El Segundo, CA (US); Antonio Bernerd Martinez, El Segundo, CA (US); Eahab Nagi El Naga, Topanga, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 537 days.

(21) Appl. No.: 15/627,103

(22) Filed: Jun. 19, 2017

(65) Prior Publication Data
US 2018/0363691 A1    Dec. 20, 2018

(51) Int. Cl.
*F16B 25/00* (2006.01)
*B21K 1/44* (2006.01)
(Continued)

(52) U.S. Cl.
CPC ............ *F16B 25/0036* (2013.01); *B21K 1/44* (2013.01); *B21K 1/56* (2013.01); *B21K 1/64* (2013.01);
(Continued)

(58) Field of Classification Search
CPC ........ F16B 5/01; F16B 5/0225; F16B 5/0241; F16B 25/00; F16B 25/0036;
(Continued)

(56) References Cited

U.S. PATENT DOCUMENTS

| 2,344,102 A | * | 3/1944 | Meisterhans | ......... F16B 37/048 |
| | | | | 411/82.2 |
| 5,203,226 A | | 4/1993 | Hongou et al. | |

(Continued)

FOREIGN PATENT DOCUMENTS

| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
(Continued)

*Primary Examiner* — Roberta S Delisle
(74) *Attorney, Agent, or Firm* — Arent Fox LLP

(57) ABSTRACT

One aspect is an apparatus including an additively manufactured first component and a captive nut contained within the first component for interconnecting the first component to a second component. Another aspect is an apparatus including a first additively manufactured component having a hole and a second additively manufactured component having a socket. The apparatus further includes a pin having a head engaging a surface of the first component and a shaft extending from the head through the hole in the first component and into the socket of the second component. Another aspect is an apparatus including first and second panels. The apparatus also includes a bolt having a head and a shaft extending from the head and a nut located at a distal end of the shaft. The first and seconds panels may be sandwiched between the bolt and nut to interconnect the first and second panels.

25 Claims, 17 Drawing Sheets

(X-direction is into the page)

(51) Int. Cl.
| | |
|---|---|
| *B21K 1/56* | (2006.01) |
| *B21K 1/74* | (2006.01) |
| *B21K 1/64* | (2006.01) |
| *F16B 5/02* | (2006.01) |
| *F16B 37/04* | (2006.01) |
| *B33Y 80/00* | (2015.01) |
| *B33Y 10/00* | (2015.01) |
| *B33Y 30/00* | (2015.01) |
| *F16B 41/00* | (2006.01) |
| *F16B 39/16* | (2006.01) |
| *F16B 33/00* | (2006.01) |

(52) U.S. Cl.
CPC .............. *B21K 1/74* (2013.01); *F16B 5/0225* (2013.01); *F16B 25/0094* (2013.01); *F16B 37/048* (2013.01); *B33Y 10/00* (2014.12); *B33Y 30/00* (2014.12); *B33Y 80/00* (2014.12); *F16B 5/0241* (2013.01); *F16B 25/00* (2013.01); *F16B 33/002* (2013.01); *F16B 37/044* (2013.01); *F16B 39/16* (2013.01); *F16B 41/002* (2013.01)

(58) Field of Classification Search
CPC .. F16B 25/0094; F16B 33/002; F16B 37/044; F16B 37/048; F16B 37/122; F16B 39/16; F16B 41/002
USPC ........ 411/82, 82.1, 172, 177, 178, 190, 432, 411/908
See application file for complete search history.

(56) References Cited

U.S. PATENT DOCUMENTS

| | | | |
|---|---|---|---|
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,604,899 B2 * | 8/2003 | Kubler ................. F16B 33/004 411/258 |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,902,366 B2 * | 6/2005 | Ducker, III ........... F16B 33/004 411/258 |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,297,169 B2 * | 10/2012 | Kunda ................. F16B 5/025 411/108 |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,491,399 B2 * | 7/2013 | Suefuji ................. B29C 70/865 264/136 |
| 8,584,433 B2 * | 11/2013 | Masuda ................. F16B 5/01 52/787.1 |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,777,537 B2 * | 7/2014 | Fritsch ................. F16B 5/02 411/338 |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,446,488 B2 * | 9/2016 | Coronado ............. B23P 19/04 | |
| 9,457,514 B2 | 10/2016 | Schwäzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |

(56) References Cited

U.S. PATENT DOCUMENTS

| | | |
|---|---|---|
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |

(56) References Cited

U.S. PATENT DOCUMENTS

| | | |
|---|---|---|
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2005/0047893 A1 | 3/2005 | Schwarzbich |
| 2006/0108783 A1 | 5/2006 | Ni et al. |
| 2007/0051704 A1 | 3/2007 | Husmann et al. |
| 2007/0261787 A1 | 11/2007 | Malis |
| 2009/0129885 A1 | 5/2009 | Csik et al. |
| 2014/0277669 A1 | 9/2014 | Nardi et al. |
| 2016/0040708 A1* | 2/2016 | Limatoc ............... F16B 39/026 411/306 |
| 2016/0123373 A1* | 5/2016 | Gambardella ........ F01D 11/003 411/108 |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015147973 A1 | 10/2015 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Sep. 28, 2018, regarding PCT/US2018/038207.
First Office Action dated Feb. 19, 2019, regarding China Application No. 201820944266.5.

* cited by examiner (X-direction is into the page)

(Z-direction is out of the page)

US 10,781,846 B2

3-D-PRINTED COMPONENTS INCLUDING FASTENERS AND METHODS FOR PRODUCING SAME

BACKGROUND

Field

The present disclosure relates generally to apparatus and techniques in manufacturing, and more specifically to three-dimensional (3-D) printed components that include a fastener, the components for use in producing vehicles, boats, aircraft and other mechanical structures.

Background

3-D printing, which may also be referred to as additive manufacturing, is a process used to create 3-D objects. The 3-D objects may be formed using layers of material based on digital model data of the object. A 3-D printer may form the layers of material using the digital model data to print one layer at a time. 3-D printed objects may be almost any shape or geometry.

A 3-D printer may disseminate a powder layer (e.g., powdered metal) on an operating surface. The powder layer may be approximately 100 microns thick. The 3-D printer may then bond particular areas of the powder layer into a layer of the object, e.g., by using a laser to bond the powder of the powder layer together. The steps may be repeated to sequentially form each layer. Accordingly, the 3-D printed object may be built layer by layer to form the 3-D object.

3-D printed components may be used to produce sub-components for various devices or apparatus. The 3-D printed sub-components may need to be attached or connected to other sub-components, including other 3-D printed sub-components, extruded sub-components, or still other sub-components.

SUMMARY

Several aspects of 3-D printed components and related fasteners will be described more fully hereinafter with reference to three-dimensional printing techniques.

One aspect is an apparatus including an additively manufactured first component and a captive nut contained within the first component for interconnecting the first component to a second component.

Another aspect is an apparatus including a first additively manufactured component having a hole and a second additively manufactured component having a socket. The apparatus further includes a pin having a head engaging a surface of the first component and a shaft extending from the head through the hole in the first component and into the socket of the second component.

Another aspect is an apparatus including first and second panels. The apparatus also includes a bolt having a head and a shaft extending from the head and a nut located at a distal end of the shaft. The first and seconds panels may be sandwiched between the bolt and nut to interconnect the first and second panels.

It will be understood that other aspects of 3-D printed components and related fasteners will become readily apparent to those skilled in the art from the following detailed description, wherein it is shown and described only several embodiments by way of illustration. As will be realized by those skilled in the art, the 3-D printed components and related fasteners are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of 3-D printed components and related fasteners will now be presented in the detailed description by way of example, and not by way of limitation, in the accompanying drawings, wherein.

DETAILED DESCRIPTION

Figure 1A:
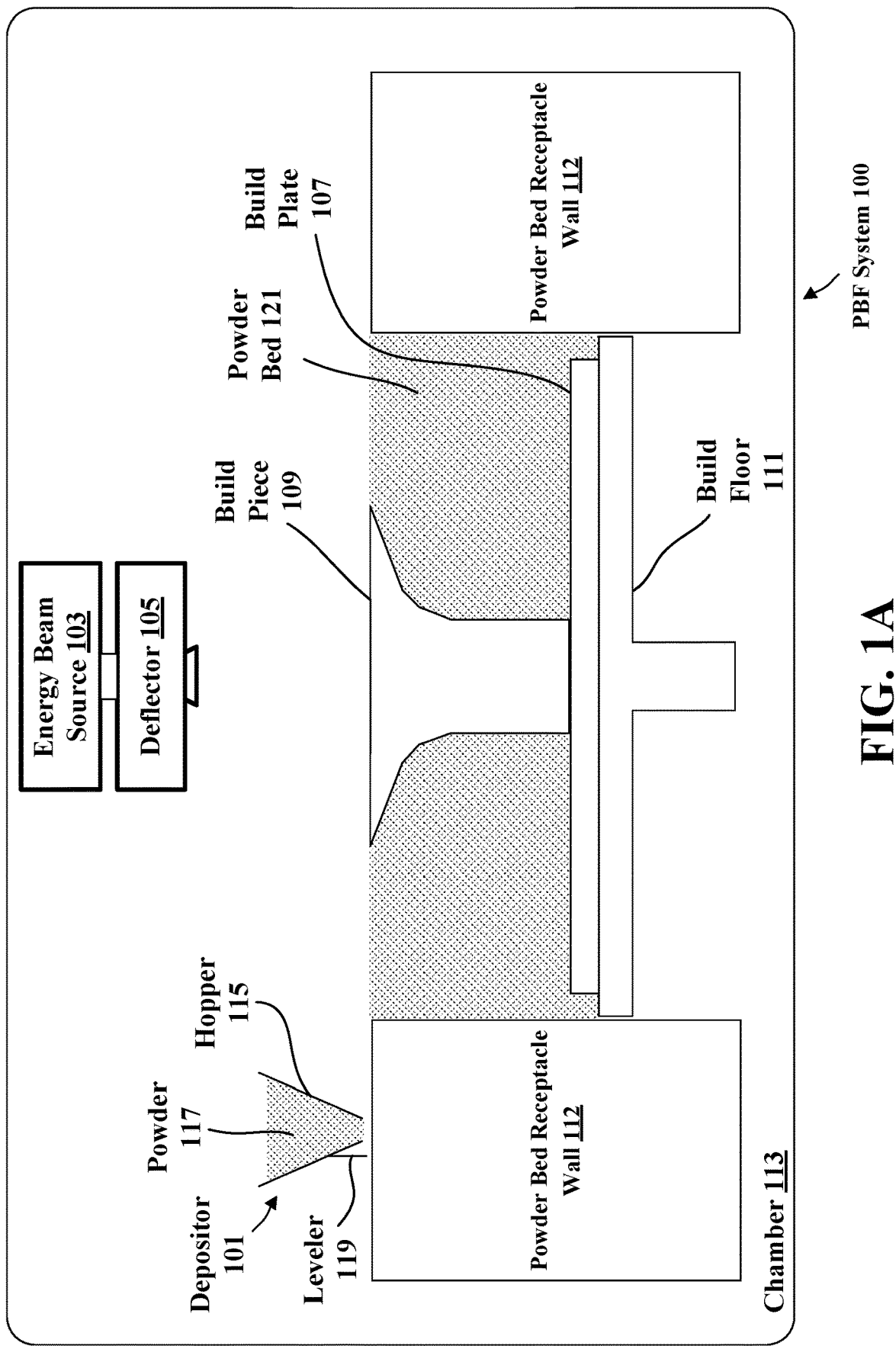
FIGS. 1A-D illustrate an example 3-D printer system during different stages of operation.

The detailed description set forth below in connection with the appended drawings is intended to provide a description of various exemplary embodiments of 3-D printed components and related fasteners and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing in the context of composite tooling provides significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that are not possible to manufacture via traditional manufacturing processes.

FIGS. 1A-D illustrate respective side views of an exemplary 3-D printer system. In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
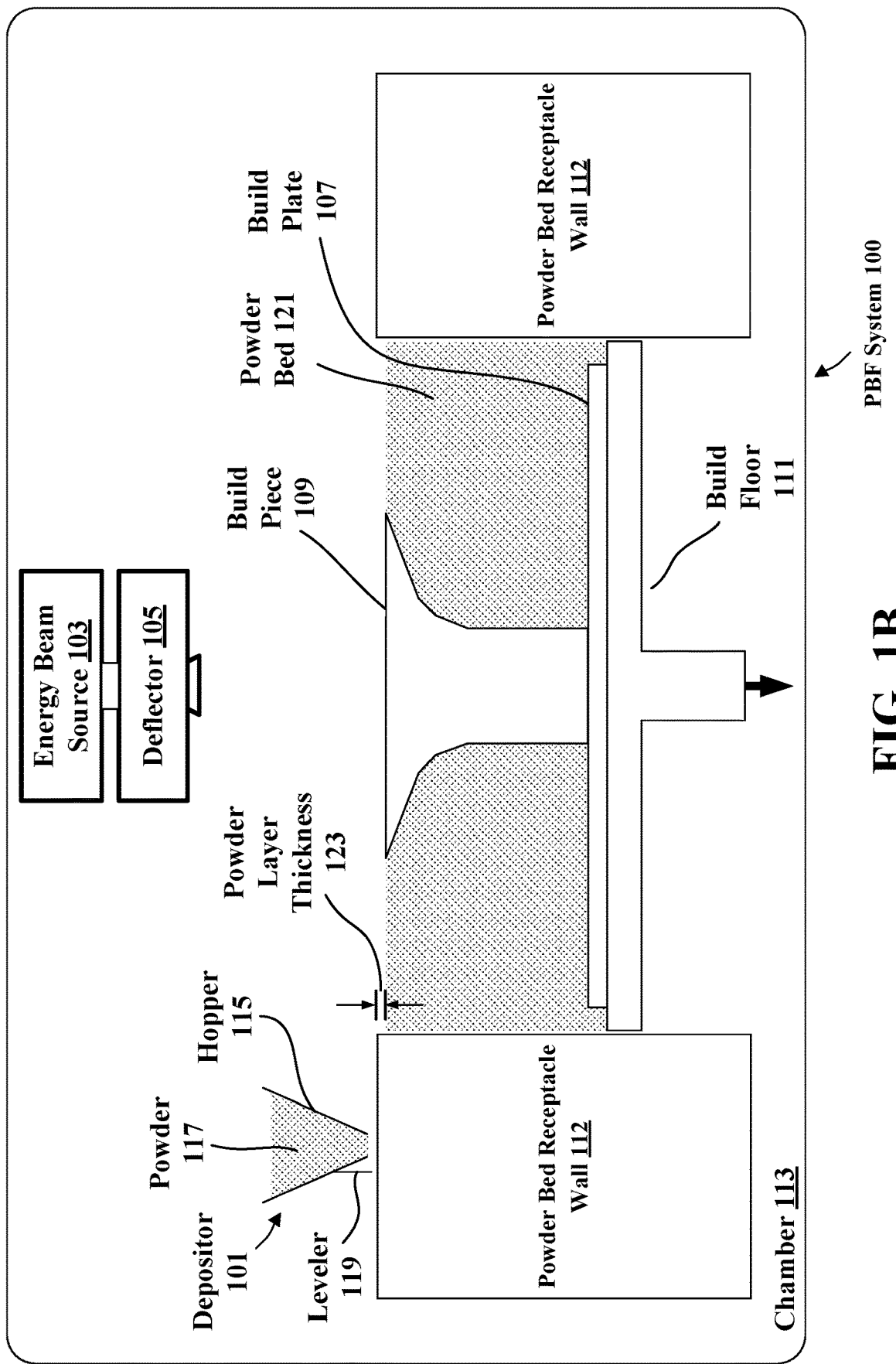

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
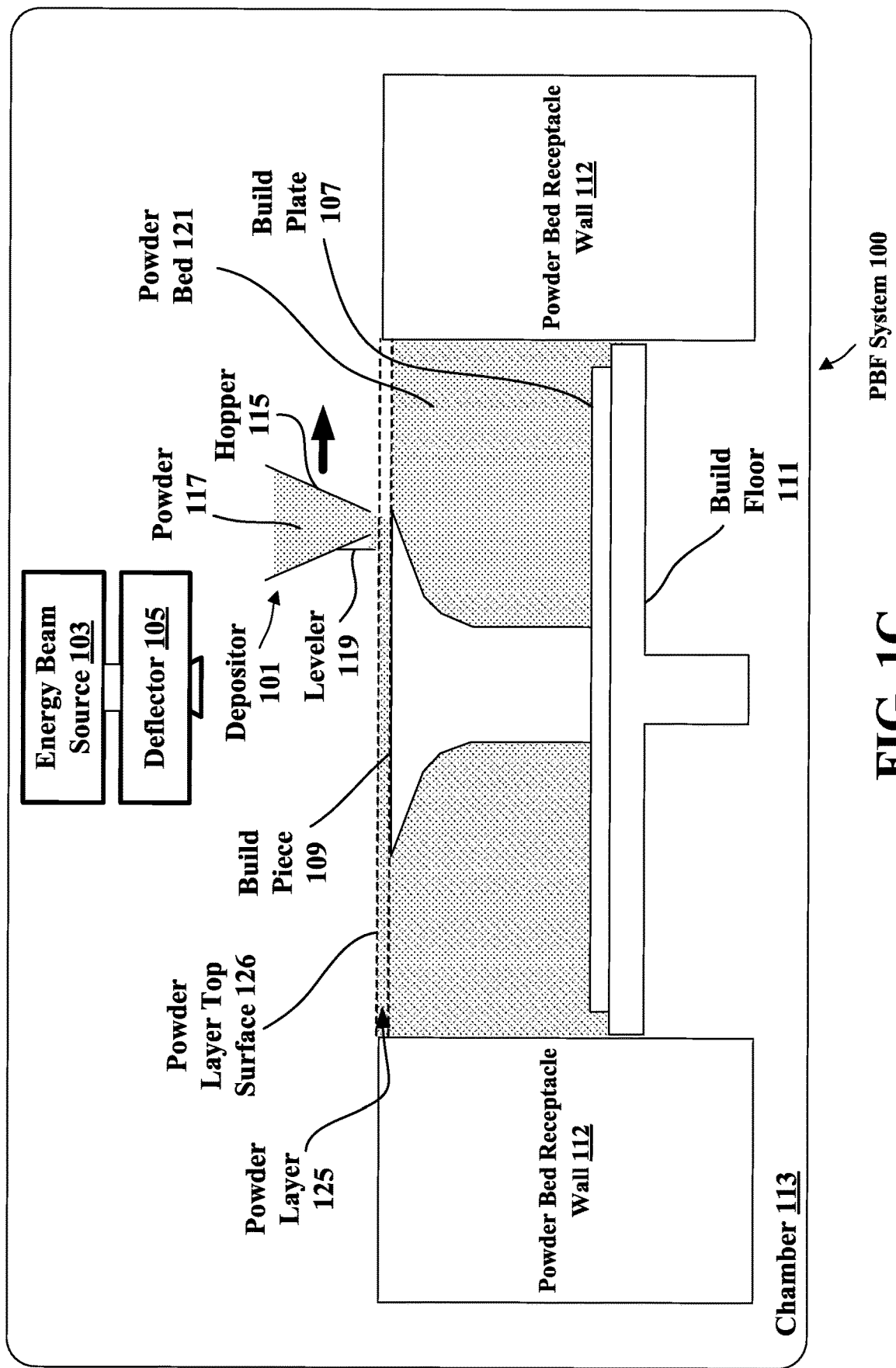

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
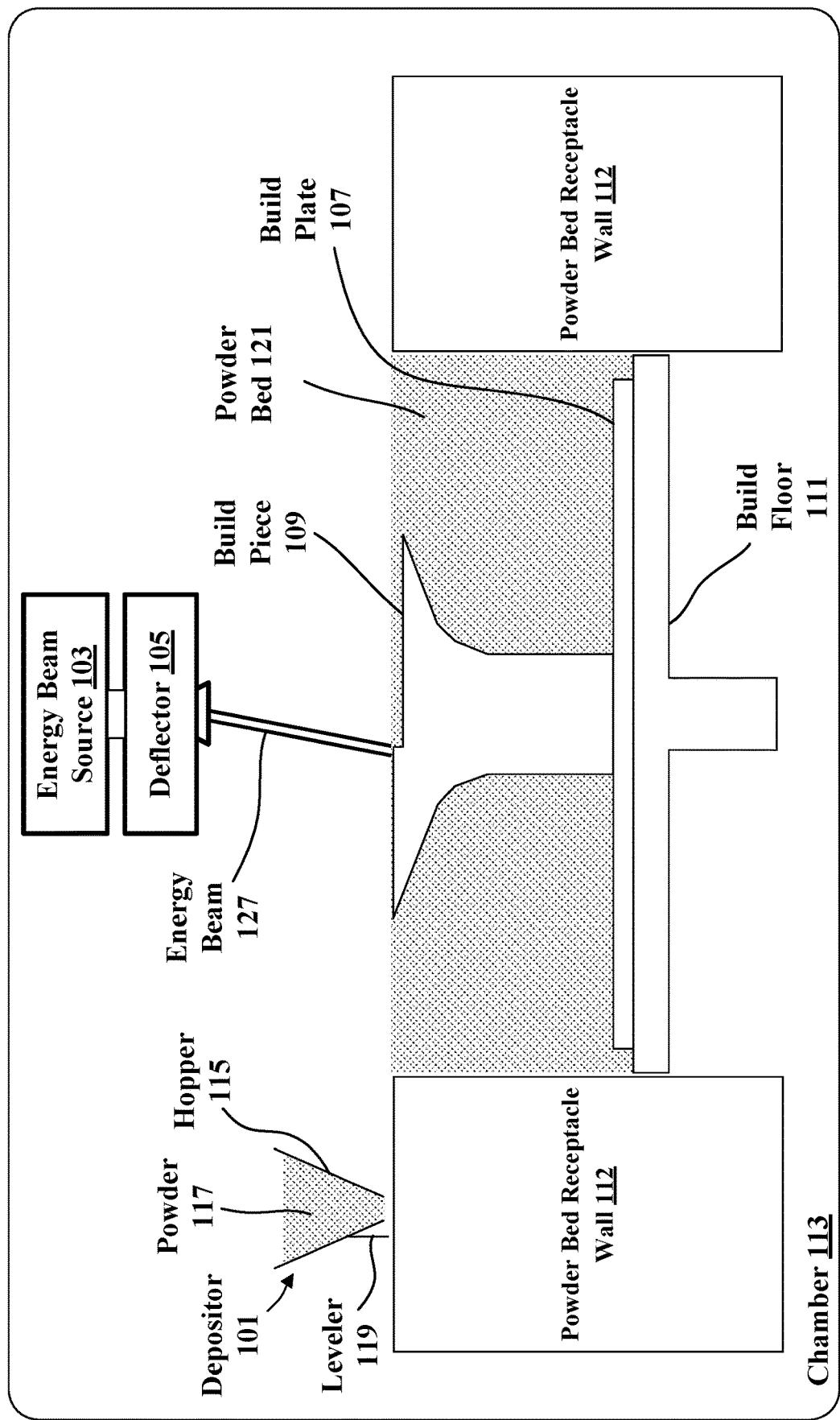

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 2A:
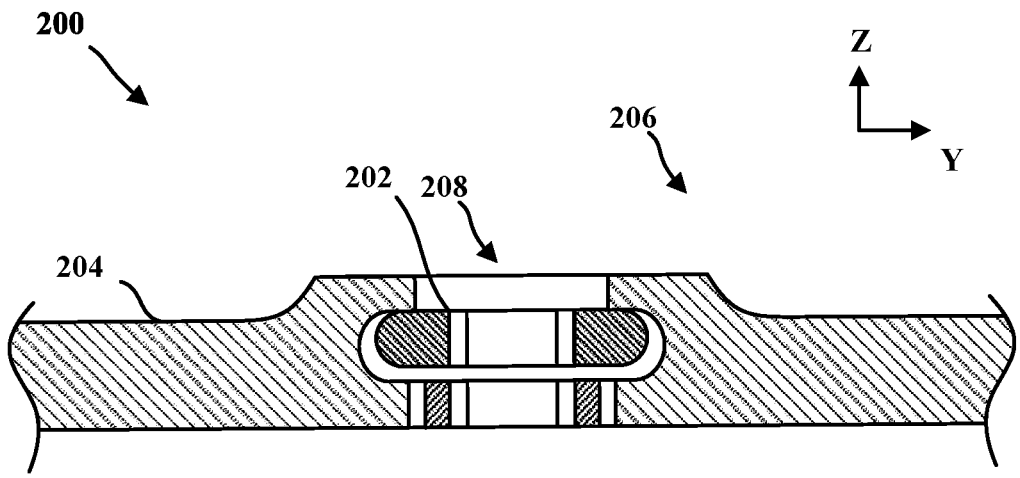
FIGS. 2A-2B are diagrams illustrating a 1-way captive nut co-printed within a node.
Figure 2B:
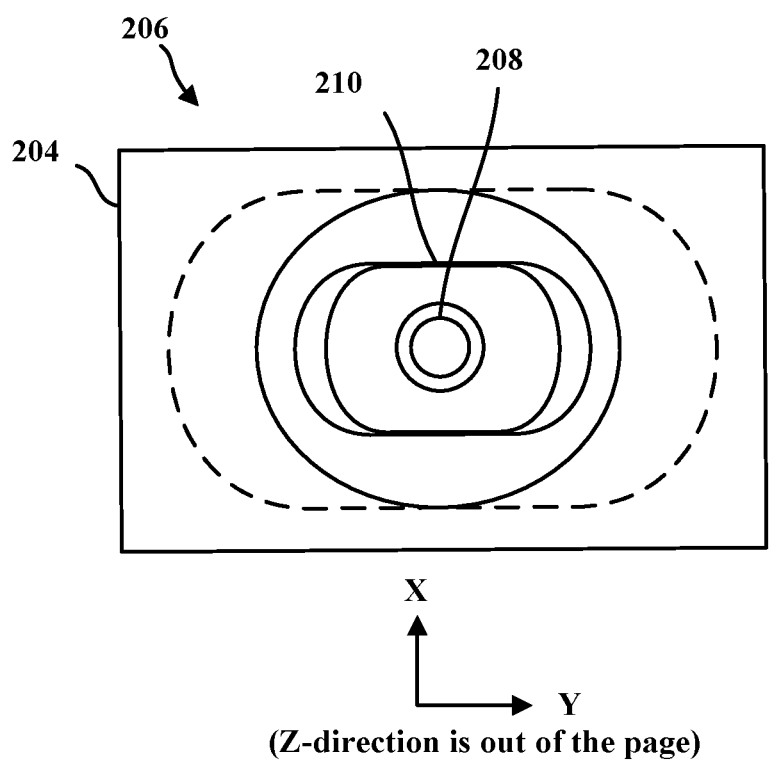

FIGS. 2A-2B are diagrams 200 illustrating a 1-way captive nut 202 co-printed (co-additively manufactured) within a node 204 forming a connecting unit 206. In some examples, the 1-way captive nut 202 may be used for nonstructural connections. In other words, in some examples, the 1-way captive nut 202 may be used for connections that are not load carrying.

When the 1-way captive nut 202 is used to form a connection, a bolt (not shown) may be inserted through a hole 208 in the connecting unit 206 and into the nut 202. The nut 202 may hold the bolt. For example, in one aspect, the nut 202 may be threaded, e.g., the threads may be co-printed with the nut 202. In another aspect, the nut 202 may initially be unthreaded, e.g., the nut 202 may be threaded after the nut 202 is printed. In yet another aspect, the nut 202 may use some other means of securing the bolt within the nut 202, e.g., a friction fit or other suitable mechanism may be used. Forming threads in the nut 202 after printing the nut 202 may in some embodiments allow for more precise threads to be formed when compared to 3-D printing (additive manufacturing) of threads using certain 3-D printers.

In an example, the connection unit 206 may allow an apparatus to form a connection. The apparatus (e.g., connection unit 206) may include an additively manufactured first component, such as the node 204. A captive nut 202 may be contained within the first component (e.g., node 204) for interconnecting the first component (e.g., node 204) to a second component (not shown). In an aspect, the captive nut 202 may be co-printed with the first component (e.g., node 204). In another aspect, the threads may also be additively manufactured. For example, the threads may also be printed on the nut 202, as the nut 202, and the first component (e.g., the node 204) are co-printed. An anti-rotation aspect 210 may be included. The anti-rotation aspect 210 may be formed adjacent to a flat aspect of the nut 202 to keep the nut 202 from rotating. In an aspect, the 1-way captive nut 202 may float in the x-direction.

Figure 3:
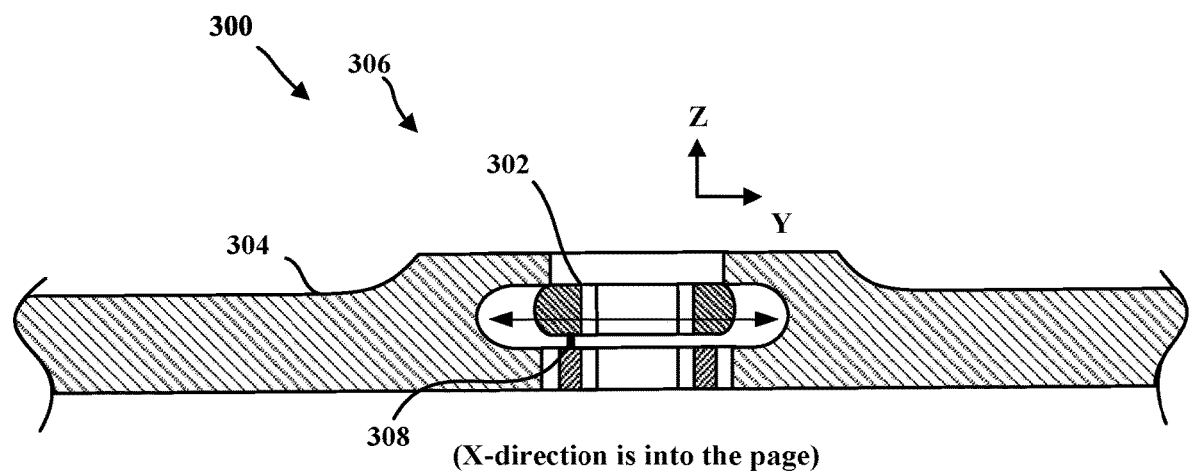
FIG. 3 is a diagram illustrating a 2-way captive nut.

FIG. 3 is a diagram 300 illustrating a 2-way captive nut design 306. A connection unit using a 2-way captive nut design 306 may include a nut 302 allowing for float in both the x-direction and the y-direction. The 2-way captive nut may also provide for anti-rotation 308. A connection unit using a 2-way captive nut design 306 may include a nut 302 that may be threaded or unthreaded. For example, in one aspect, the nut 302 may be threaded, e.g., the threads may be co-printed with the nut 302. In another aspect, the nut 302 may initially be unthreaded, e.g., the nut 302 may be threaded after the nut 302 is printed. In yet another aspect, the nut 302 may use some other means of securing the bolt within the nut 302, e.g., a friction fit or other suitable mechanism may be used.

For example, an apparatus (2-way captive nut design 306) may include an additively manufactured first component 304 and a captive nut 302 contained within the first component 304 for interconnecting the first component 304 to a second component. The captive nut 302 may be co-printed with the first component 304. In an aspect, the captive nut 302 comprises threads. In another aspect, the threads are additively manufactured. In an aspect, the captive nut 302 may float within the first component 304. The captive nut 302 may be a 2-way captive nut. In an aspect, the captive nut 302 is prevented from rotating by the first component. The 2-way captive nut 302 may be used for nonstructural connections between nodes (e.g., 304) and/or other units.

Figure 4:
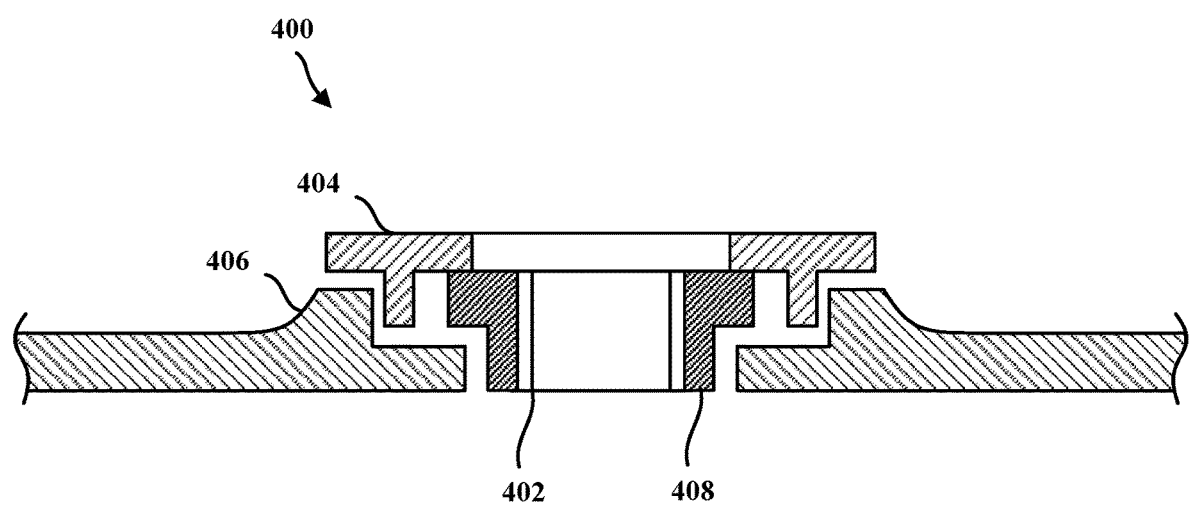
FIG. 4 is a diagram illustrating a 3-way captive nut and threaded shim.

FIG. 4 is a diagram 400 illustrating a 3-way captive nut 402 and threaded shim 404. The threaded shim 404 may be installed into an additively manufactured first component 406, such as a node. In an aspect, the 3-way captive nut 402 may be within a holder 408 contained within the component 406 by threaded shim 404. The 3-way captive nut 402 and threaded shim 404 may be used to connect nodes and/or other units. The structure of a connection using the 3-way captive nut 402, threaded shim 404, and component 406 may be similar to the structure using the 1-way captive nut 202 of FIG. 2 and/or the 2-way captive nut 302 of FIG. 3.

In an example, a difference between a connection using the 1-way captive nut 202 of FIG. 2 and a connection using the 3-way captive nut 302 of FIG. 3 may be that the floating nut 302 may be contained within, e.g., three separate pieces (the threaded shim 304, the component 306, the holder 308) that are joined together instead of one continuous socket as in the apparatus of FIG. 2). In an example, a difference between a connection using the 2-way captive nut 302 of FIG. 3 and a connection using the 3-way captive nut 402 of FIG. 4 may be that the floating nut 402 may be contained within, e.g., three separate pieces (the threaded shim 404, the component 406, the holder 408) that are joined together instead of a socket capturing the nut in 2 directions as in the apparatus of FIG. 3). In an example, the nut 402 may be co-printed into the component 406, e.g., a node. The nut may be threaded or unthreaded. In some aspects, the 3-way captive nut 402 may be used for nonstructural connections.

Figure 5:
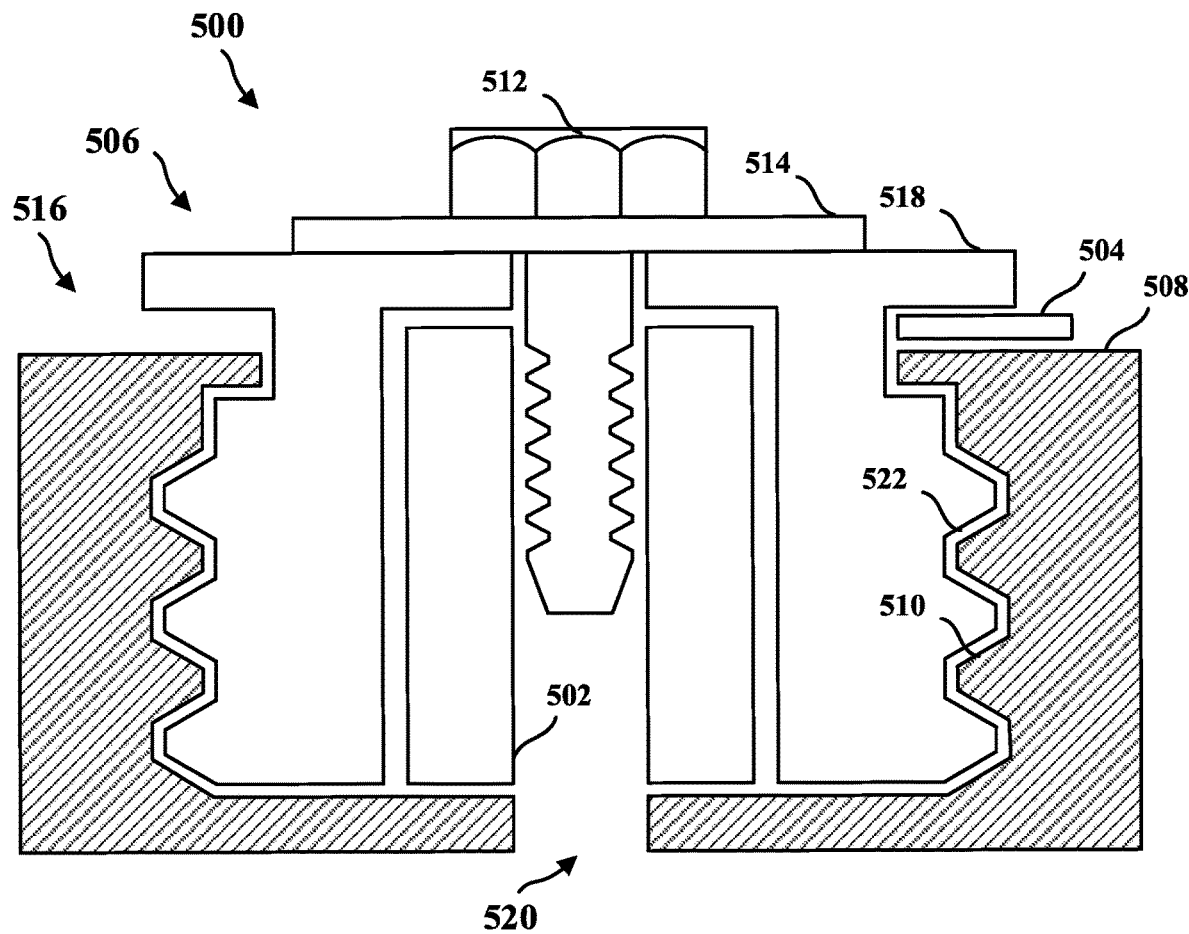
FIG. 5 is a diagram illustrating a 3-way captive nut and threaded shim with a top piece attached to the connecting units via threads.

FIG. 5 is a diagram 500 illustrating a 3-way captive nut 502 and threaded shim 504 with a top piece 506 attached to the connecting unit 508 via threaded portion 510 as in FIG. 4, however, in FIG. 5, the top piece 506 is attached to the connecting unit 508 via the threaded portion 510 rather than a flat connection as in FIG. 4. A bolt 512 may be used to connect other components 514, e.g., nodes. The bolt 512 may be screwed into the nut 502 after the other parts (e.g., the 3-way captive nut 502, the threaded shim 504, and the top piece 506) are printed to complete an assembly 516. The shim 504 may be wedged between an "upper T-part" 518 of the top piece 506 and the connecting unit 508 and other node(s) or other components involved. The nut may be threaded or unthreaded.

In an aspect, an apparatus (e.g., assembly 516) may include an additively manufactured first component (e.g., connecting unit 508) and a captive nut 502 contained within the first component (e.g., connecting unit 508) for interconnecting the first component to a second component. The apparatus (e.g., assembly 516) may further include a shim 504 which together with the first component (e.g., connecting unit 508) forms a cavity 520 and allows the nut 502 to move along an axial axis of the nut 502. The apparatus (e.g., assembly 516) may further include an insert (top piece 506) forming the cavity 520. For example, the first component (e.g., connecting unit 508) may be engaged with the insert (top piece 506), and the nut 502 may be contained within the cavity 520.

In an aspect, the first component (e.g., connecting unit 508) may include an additively manufactured threaded portion 510 and the insert (top piece 506) may include a threaded insert 522 engaged with the threaded portion 510 of the first component (e.g., connecting unit 508). The shim 504 may be between a portion of the first component (e.g., connecting unit 508) and the insert (top piece 506).

Figure 6:
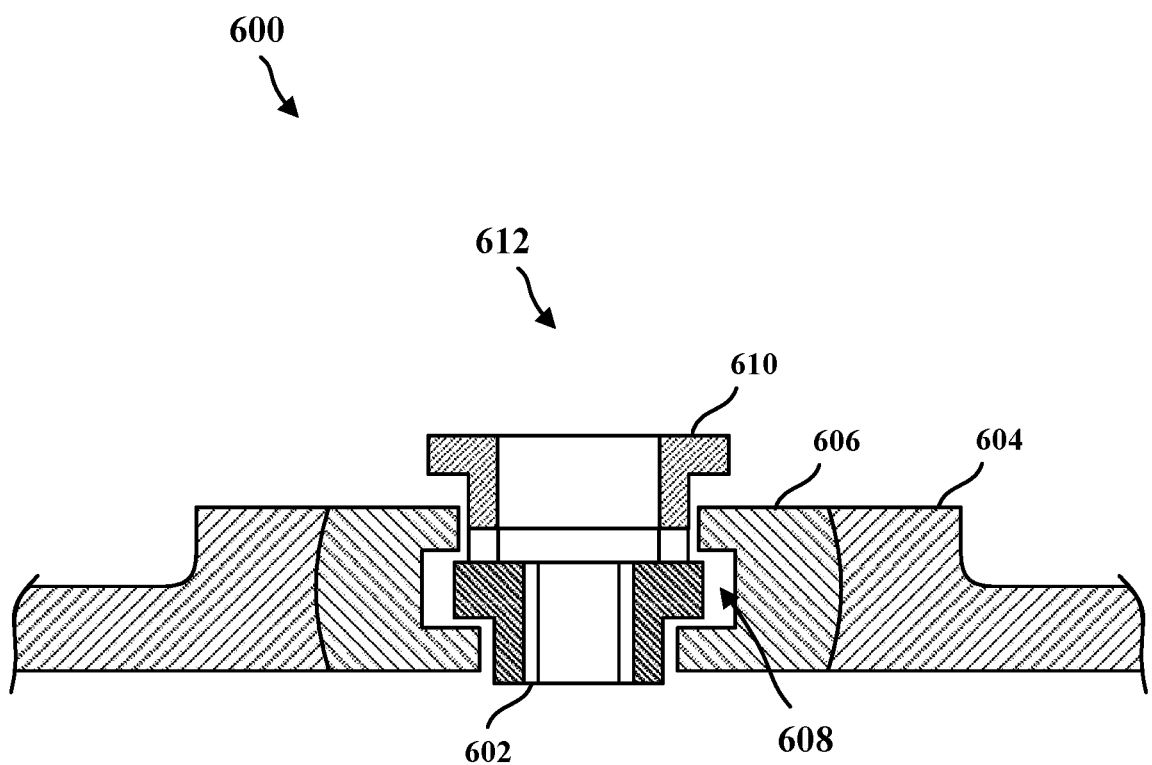
FIG. 6 is a diagram illustrating a nut co-printed into a node.

FIG. 6 is a diagram 600 illustrating a nut 602 co-printed into a node 604. The nut 602 is co-printed into the node 604 similar to the example illustrated in FIG. 4; however, the nut 602 in the example of FIG. 6 is surrounded by spherical captive housing 606. The spherical captive housing 606 may have a cutout 608 that encases the upper, flat part of the nut 602 with enough space to allow for radial float. A shim 610 may be printed with right-hand threads and may be installed on top of the node 604. The nut 602 may be threaded or unthreaded. In an aspect, an apparatus 612 may include an additively manufactured first component (e.g., node 604) and a captive nut 602. The captive nut 602 may be contained within the first component (e.g., node 604) for interconnecting the first component (e.g., node 604) to a second component (not shown). The apparatus 612 may include an additively manufactured semi-spherical housing 606 that may be co-printed with the first component (e.g., node 604) and the nut 602. In an aspect, the nut may be contained within the first component (e.g., node 604) by the semi-spherical housing 606.

Figure 7:
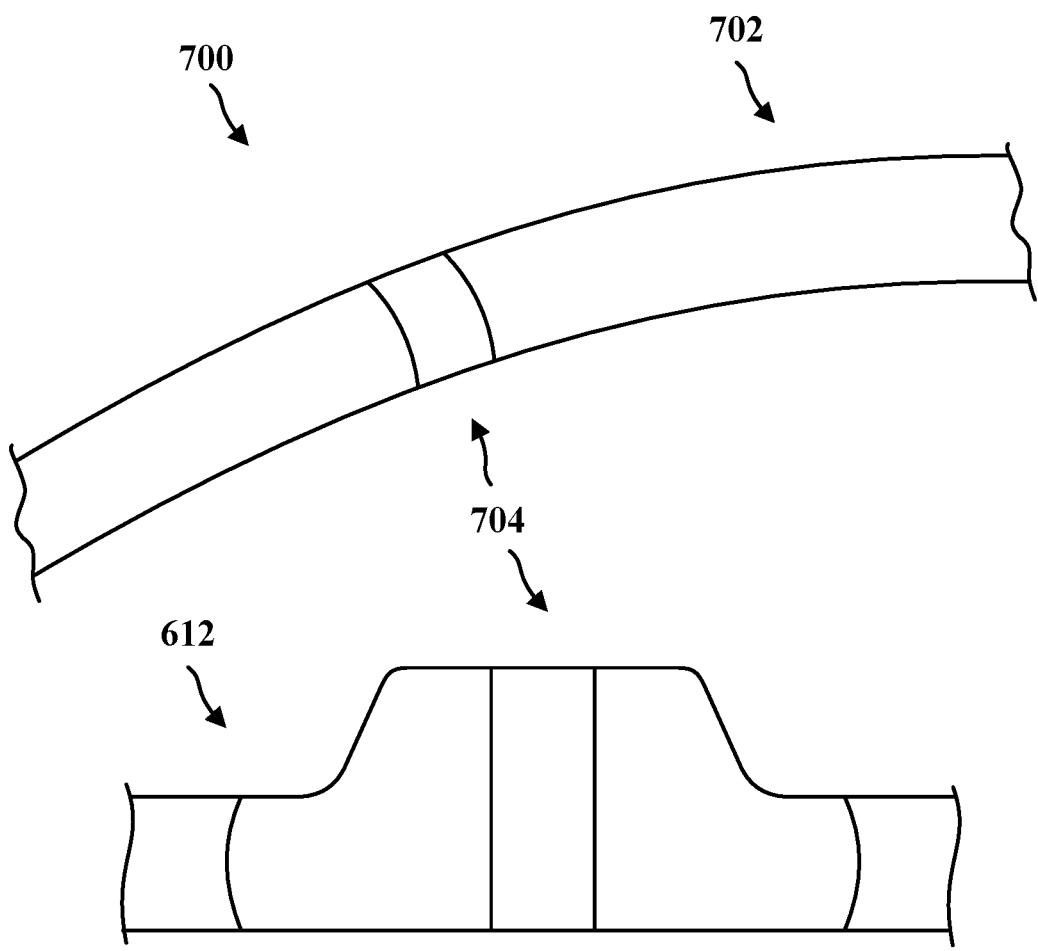
FIG. 7 is a diagram illustrating manufacturing tolerance issue.

FIG. 7 is a diagram illustrating manufacturing tolerance issue. The issues may be observed in conventional manufacturing. The manufacturing tolerance issue may be resolved using 3-D printing. For example, the apparatus 612 of FIG. 6 may be used to address some manufacturing tolerance issues.

In an aspect, two components (e.g., component 702 and apparatus 612) to be connected together may be angled relative to each other as illustrated in FIG. 7. More particularly, bolt holes 704 may be angled relative to each other. The additively manufactured semi-spherical housing 606 illustrated in FIG. 6 may provide for adjustments to the angle of one of the bolt holes 704, e.g., the bolt hole in the apparatus 612. In an aspect, the nut may be contained within the first component (e.g., node 604) by the semi-spherical housing 606. For example, the additively manufactured semi-spherical housing 606 illustrated in FIG. 6 may allow the angle of one of the bolt holes 704, e.g., the bolt hole in the apparatus 612 to be adjusted such that the bolt holes 704 are parallel or nearly parallel and line up with each other such that a bolt may be installed through the bolt holes 704.

Figure 8:
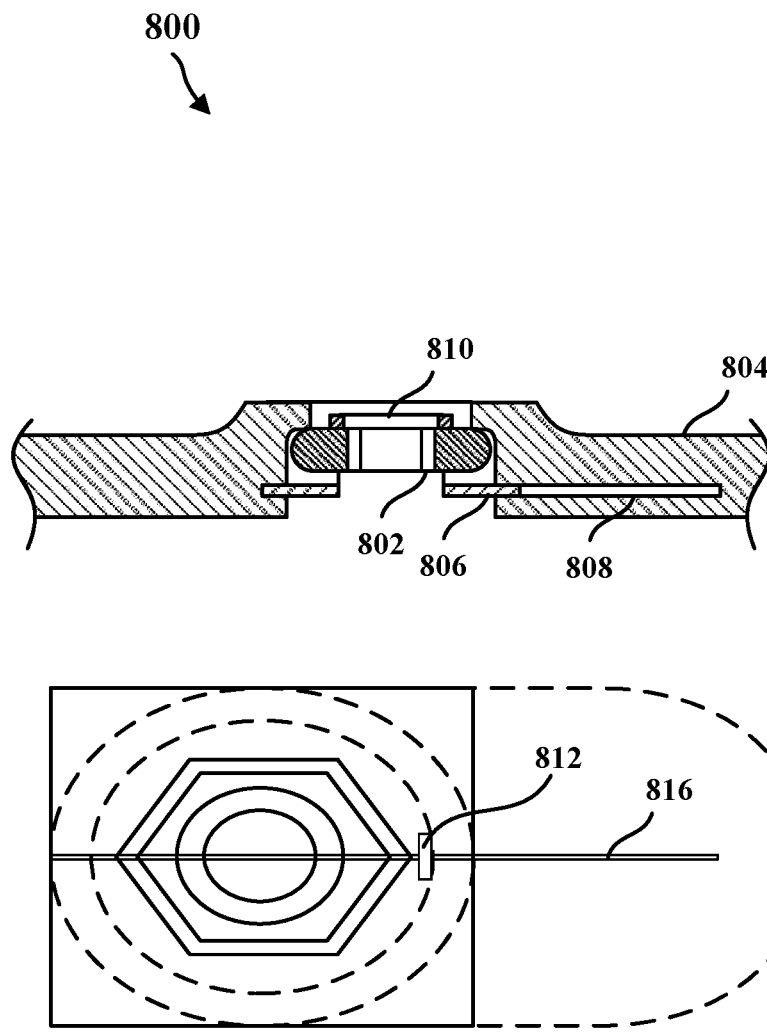
FIG. 8 is a diagram illustrating a nut that may be installed after the node is printed rather than co-printed with the node.

FIG. 8 is a diagram 800 illustrating a nut 802 that may be installed after the node 804 is 3-D printed (additively manufactured) rather than co-printed with the node 804. In an aspect, for structural connections, the nut 802 may be installed after the node 804 is printed (additively manufactured) rather than co-printed with the node. Instead, a retainer plate 806 may be co-printed within the node 804 in the closed position. At a time of assembly, a captive tab 812 may be depressed, causing the plate to be temporarily stored in a slot 808 within the node 804 so that the nut 802 may be inserted into a cavity 810 in the node 804. The tab 812 may then be released, which may cause the retainer plate 806 to slide out so as to form a barrier and keep the nut 802 from sliding out of the cavity 810.

In an aspect, an apparatus 814 may include an additively manufactured first component (e.g., node 804) and a captive nut 802. The captive nut 802 may be contained within the first component for interconnecting the first component (e.g., node 804) to a second component. In an aspect, the apparatus may further include an additively manufactured retainer plate 806 which, together with the first component (e.g., node 804), may form a cavity 810. The nut 802 may be contained within the cavity 810. The retainer plate 806 may be configured to be slid within a slot 808 within the first component (e.g., node 804) to install the captive nut 802 and the retainer plate 806 may be configured to slide out of the slot 808 within the first component (e.g., node 804) to retain the captive nut 802. The tab 812 may slide along a groove 816 to move the retainer plate 806 into and out of the slot 808.

Figure 9:
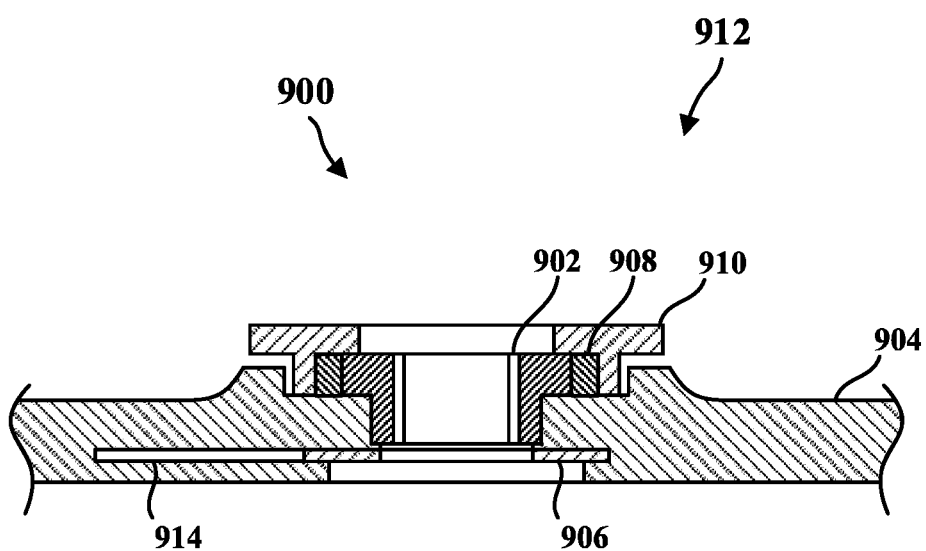
FIG. 9 is a diagram illustrating a nut that may be installed after the node is printed rather than co-printed with the node.

FIG. 9 is a diagram 900 illustrating a nut 902 that may be installed after the node 904 is printed rather than co-printed with the node. As in the example of FIG. 8 (captive nut 702), the nut 902 in FIG. 9 may be held in place through the use of a retainer plate 906 instead of being co-printed. Unlike the example of FIG. 7, however, the example of FIG. 9 may use either a captive lug or a captive stud 908 to facilitate the closing and releasing of the retainer plate 906. A threaded shim 910 (e.g., a right-handed threaded shim) may be installed over the nut 902 so that a bolt (not shown) may slip through the shim 910 before entering the node 904. The retainer structure 912 may be co-printed and may include a retainer slot 914.

In an aspect, an apparatus (retainer structure 912) may include an additively manufactured first component (e.g., a node 904) and a captive nut 902. The captive nut 902 may be contained within the first component (e.g., a node 904) for interconnecting the first component (e.g., a node 904) to a second component (not shown). The apparatus (retainer structure 912) may further include an additively manufactured retainer plate 906 which, together with the first component (e.g., a node 904), forms a cavity 916. The nut 902 may be contained within the cavity 916. A captive lug or a captive stud 908 may facilitate the closing and releasing of the retainer plate 906.

Figure 10:
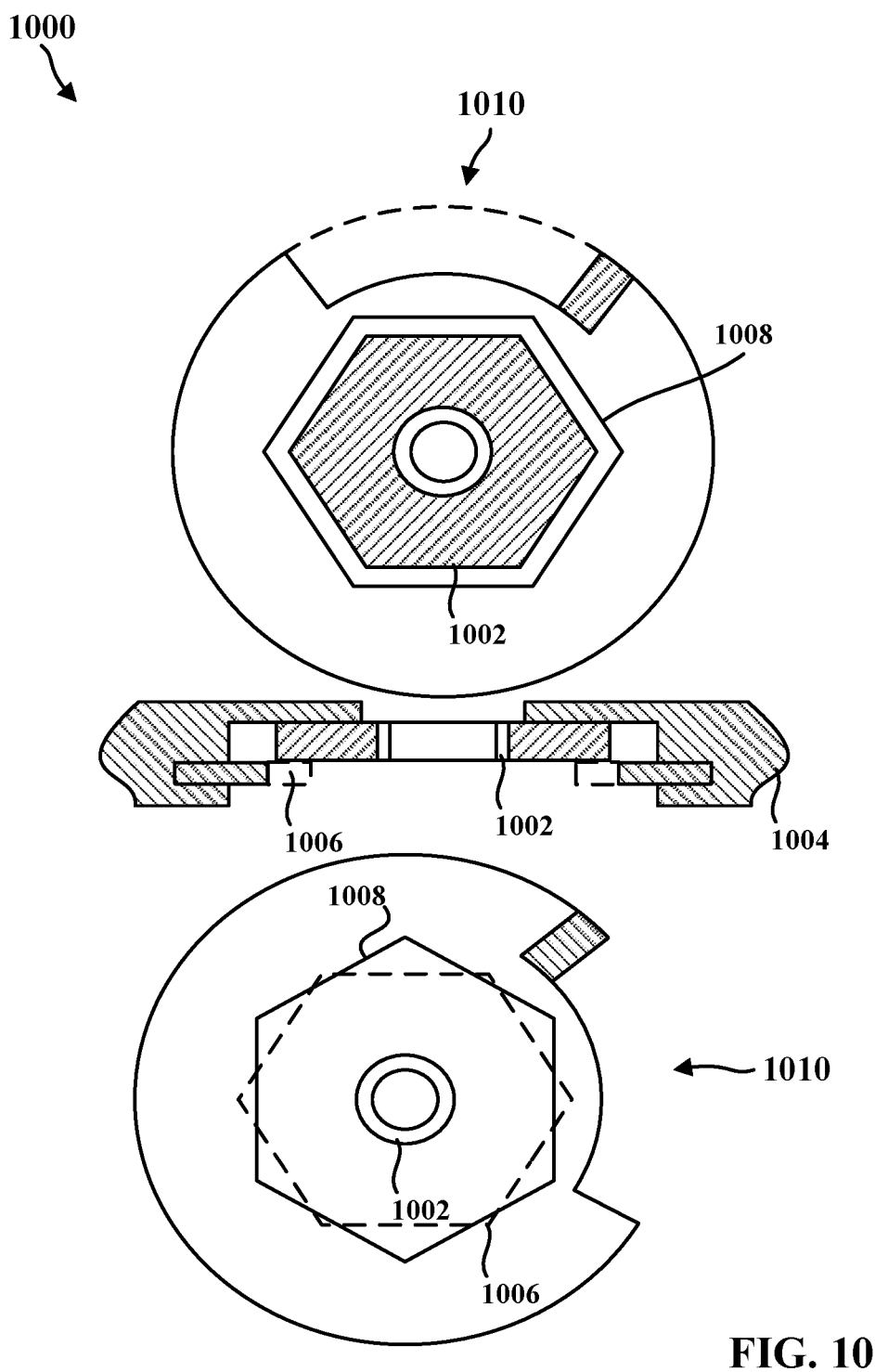
FIG. 10 is a diagram illustrating a nut that may be installed after the node is printed rather than co-printed with the node.

FIG. 10 is a diagram 1000 illustrating a nut 1002 that may be installed after the node 1004 is 3-D printed (additively manufactured) rather than co-printed with the node 1004. Diagram 1000 illustrates an example of a rotating retainer plate 1006 that may be used with the structures described herein as well as other structures. The example of FIG. 10 may be used in place the tab system described with respect to FIGS. 8 and 9 that uses plates that slide in and out of a slot.

In the example of FIG. 10, a retainer plate 1006 may be co-printed in the node with a hexagonal socket 1008 through which a slightly smaller hexagonal nut 1002 or stud may be inserted. Once the nut 1002/stud is inserted in the socket 1008, a hexagonal key 1010 may be used to rotate the retainer plate 1006 30 degrees to hold the nut 1002/stud in place.

In an example, an apparatus may include an additively manufactured first component (e.g., node 1004) and a captive nut 1002. The nut 1002 may be contained within the first component (e.g., node 1004) for interconnecting the first component (e.g., node 1004) to a second component (not shown). The retainer plate 1006 may be rotatable between a first position to open the cavity to place the nut 1002 therein and a second position to lock the nut 1002 in the cavity.

Figure 11:
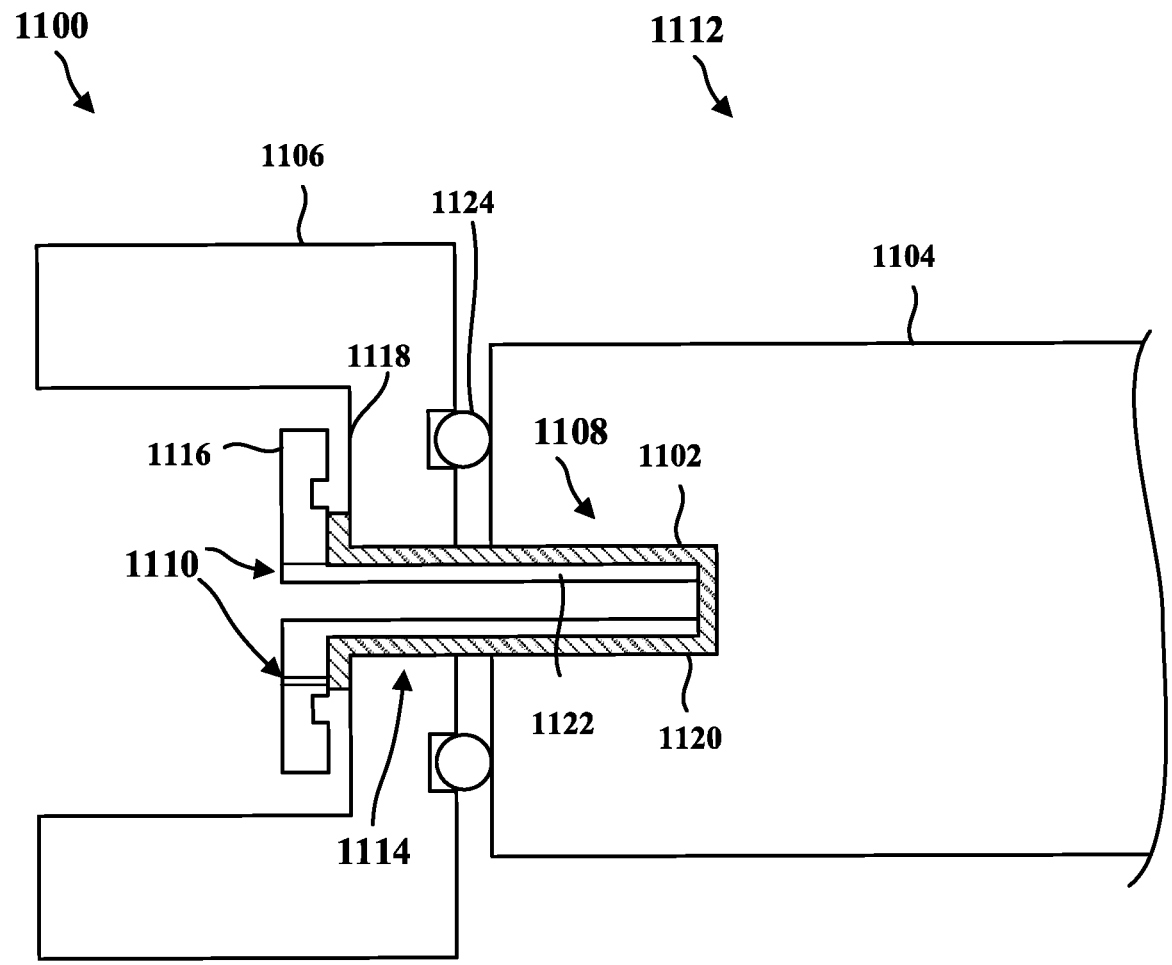
FIG. 11 is a diagram illustrating a node-to-node connection using a hollow pin in place of a bolt to connect two nodes.

FIG. 11 is a diagram 1100 illustrating a node-to-node connection using a hollow pin 1102 in place of a bolt to connect two nodes 1104, 1106. As illustrated in FIG. 11, the hollow pin 1102 may be used in place of a bolt to connect two nodes 1104, 1106. The pin 1102 may be inserted through an open-faced node (node 1106) and into a socket 1108 within another node (node 1104). Adhesive, thermoset, thermoplastic, or brazing may be used to secure the connection, e.g., at the socket 1108. The hollow pin 1102 may hold the nodes together similarly to a bolt. Additionally, the hollow pin may include adhesive channels 1110 to allow adhesive to be input through the hollow pin 1102 to adhere the hollow pin to one or more of the nodes 1104, 1106.

In an aspect, an apparatus 1112 may include a first additively manufactured component (e.g., node 1106) having a hole 1114. The apparatus 1112 may include a second additively manufactured component (e.g., node 1104) having a socket 1108. The apparatus 1112 may also include a pin 1102 having a head 1116 engaging a surface 1118 of the first component (e.g., node 1106) and a shaft 1120 extending from the head 1116 through the hole 1114 in the first component (e.g., node 1106) and into the socket 1108 of the second component (e.g., node 1104).

In an aspect, the pin 1102 include an adhesive injection channel 1110 extending from the head 1116 through the shaft 1120. The channel 1110 may be in communication with the hole 1114, the first component (e.g., node 1106) and a slot 1122 in the second component (e.g., node 1104).

In an aspect, the apparatus 1112 may further include an adhesive extending through the channel 1110 of the pin 1102 and into the hole 1114 of the first component (e.g., node 1106) and slot 1122 of the second component (e.g., node 1104).

In an aspect, the apparatus 1112 may further include a seal 1124 between the first component (e.g., node 1106) and second components (e.g., node 1104) to seal the adhesive in the hole 1114 of the first component (e.g., node 1106) and the slot 1122 of the second component (e.g., node 1104).

Figure 12:
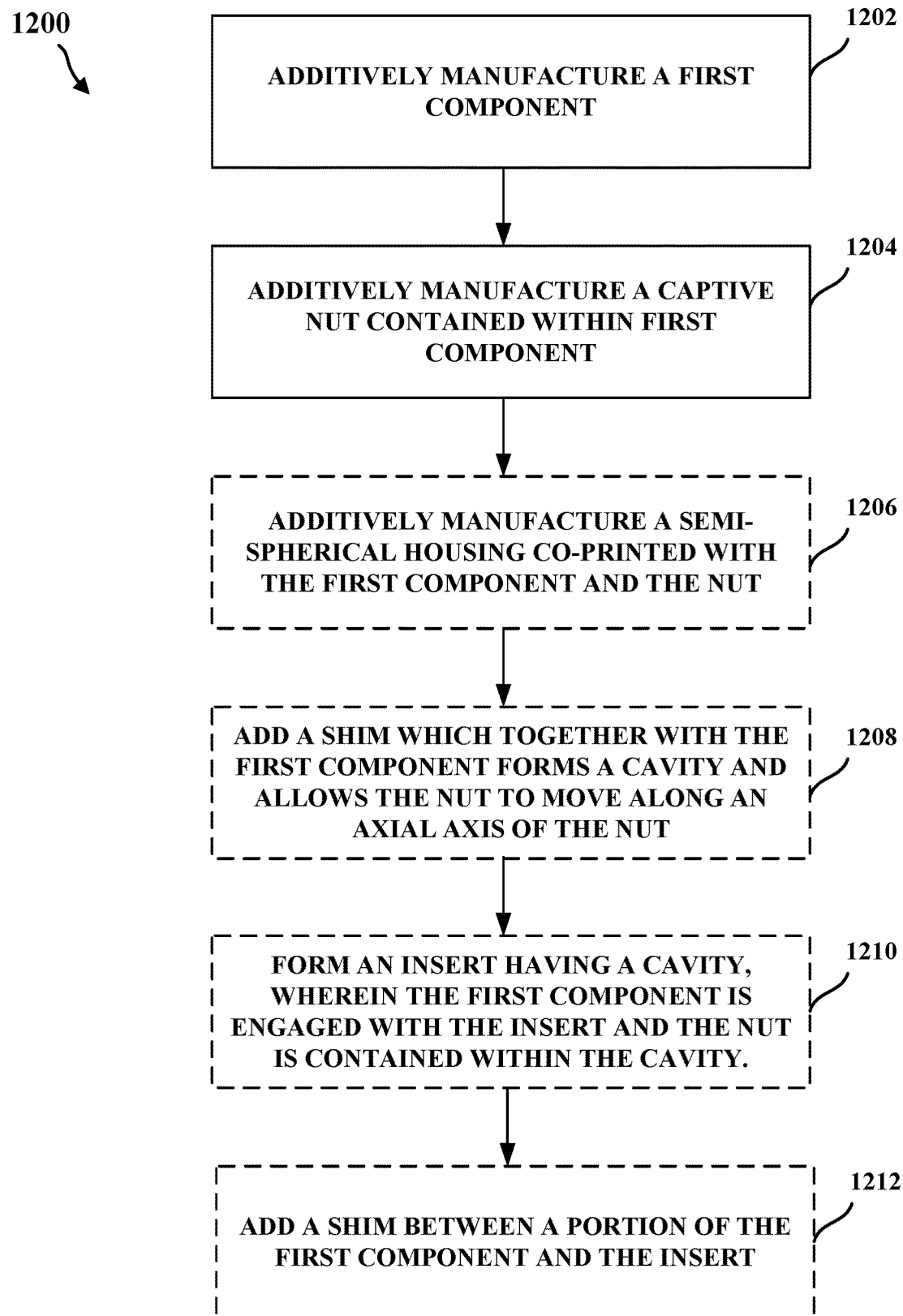
FIG. 12 is a flowchart illustrating an example method in accordance with the systems and methods described herein.

FIG. 12 is a flowchart 1200 illustrating an example method in accordance with the systems and methods described herein. At a block 1202, additively manufacture a first component. For example, additively manufacture a first component (e.g., 204, 304, 406, 508, 604, 804, 904, 1004) using an exemplary 3-D printer.

At a block 1204, additively manufacture a captive nut contained within the first component for interconnecting the first component to a second component. For example, additively manufacture a captive nut (e.g., nut 202, 302, 402, 502, 602, 802, 902, 1002) contained within first component (e.g., 204, 304, 406, 508, 604, 804, 904, 1004) for interconnecting the first component (e.g., 204, 304, 406, 508, 604, 804, 904, 1004) to a second component. In an aspect, additively manufacturing the captive nut (e.g., nut 202, 302, 402, 502, 602, 802, 902, 1002) may include co-printing the captive nut (e.g., nut 202, 302, 402, 502, 602, 802, 902, 1002) with the first component (e.g., 304, 406, 508, 604, 804, 904, 1004). In an aspect, additively manufacturing the captive nut (e.g., nut 202, 302, 402, 502, 602, 802, 902, 1002) may include forming threads. Forming threads may include additively manufacturing the threads. In an aspect, the captive nut (e.g., nut 202, 302, 402, 602) may be additively manufactured to float within the first component (e.g., 204). In an aspect, the first component (e.g., 204) may be additively manufactured to prevent the captive nut from rotating.

At block 1206, additively manufacture a semi-spherical housing co-printed with the first component and the nut, wherein the nut is contained within the first component by the semi-spherical housing. For example, additively manufacture a semi-spherical housing (606) co-printed with the first component (e.g., node 604) and the nut (602). The nut (602) may be contained within the first component (e.g., node 604) by the semi-spherical housing (606).

At block 1208, add a shim, which together with the first component, forms a cavity and allows the nut to move along an axial axis of the nut. For example, add a shim (404), which together with the first component (406), forms a cavity and allows the nut (402) to move along an axial axis of the nut (402). In an aspect, adding the shim (404) may include threading the shim to the first component (406).

At block 1210, form an insert having a cavity, wherein the first component is engaged with the insert, and the nut is contained within the cavity. For example, form an insert (506) having a cavity (520), wherein the first component (508) is engaged with the insert (506), and the nut (502) is contained within the cavity (520). In an aspect, additively manufacturing the first component (508) includes forming an additively manufactured threaded portion (510) and further comprising forming the insert (506) to include a threaded (522) insert (506) engaged with the threaded portion (510) of the first component (508).

At block 1212, add a shim between a portion of the first component and the insert. For example, add a shim (504) between a portion of the first component (508) and the insert (506).

Figure 13:
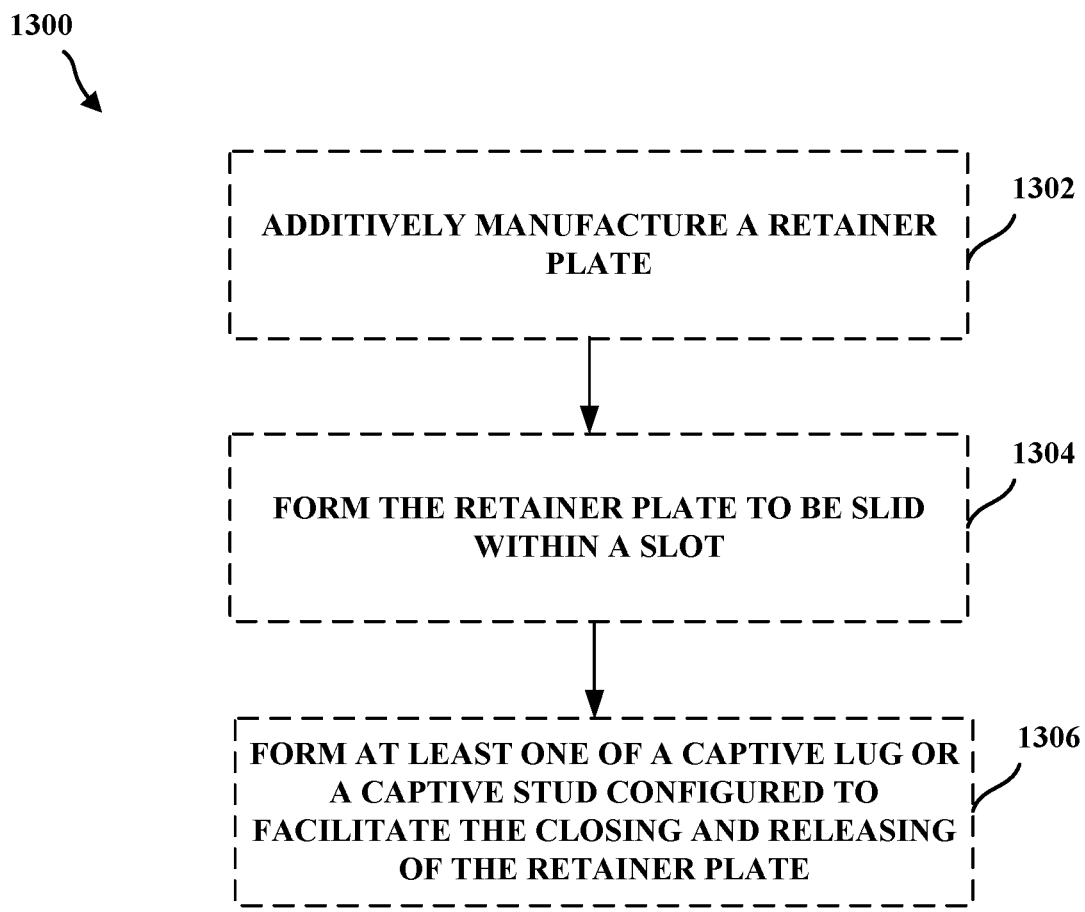
FIG. 13 is a flowchart illustrating an example method in accordance with the systems and methods described herein.

FIG. 13 is a flowchart 1300 illustrating an example method in accordance with the systems and methods described herein. At block 1302, additively manufacture a retainer plate, which together with the first component forms a cavity, wherein the nut is contained within the cavity. For example, additively manufacture a retainer plate (806) which together with the first component (e.g., node 804) forms a cavity (810). The nut (802) may be contained within the cavity (810).

At block 1304, form the retainer plate to be slid within a slot within the first component to install the captive nut and form the retainer plate to slide out of the slot within the first component to retain the captive nut. For example, form the retainer plate (806) to be slid within a slot (808) within the first component (e.g., node 804) to install the captive nut (802) and form the retainer plate (806) to slide out of the slot (808) within the first component (e.g., node 804) to retain the captive nut (802). In an aspect, the retainer plate (806) may be additively manufactured to be rotatable between a first position to open the cavity (810) to place the nut (802) therein and a second position to lock the nut (802) in the cavity (810).

In block 1306, form at least one of a captive lug or a captive stud configured to facilitate the closing and releasing of the retainer plate. For example, form at least one of a captive lug or a captive stud (908) configured to facilitate the closing and releasing of the retainer plate (906). In an aspect, additively manufacturing the first component includes additively manufacturing a node (204, 604, 804, 904, 1004).

Figure 14:
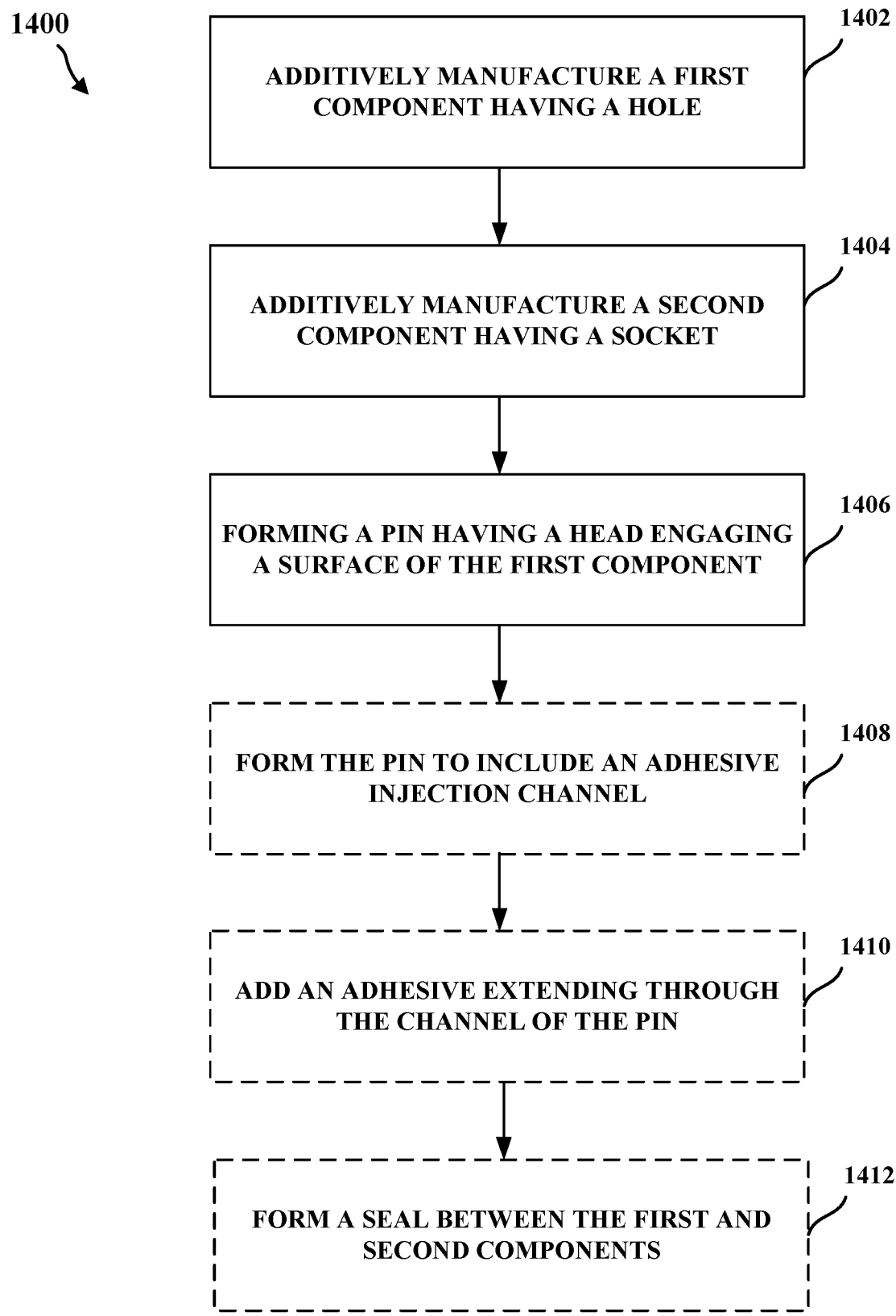
FIG. 14 is a flowchart illustrating an example method in accordance with the systems and methods described herein.

FIG. 14 is a flowchart 1400 illustrating an example method in accordance with the systems and methods described herein. In a block 1402, additively manufacture a first component having a hole. For example, additively manufacture a first component (e.g., node 1106) having a hole (1114).

In a block 1404, additively manufacture a second component having a socket. For example, additively manufacture a second component (e.g., node 1104) having a socket (1108).

In block 1406, form a pin having a head engaging a surface of the first component and a shaft extending from the head through the hole in the first component and into the socket of the second component. For example, form a pin (1102) having a head (1116) engaging a surface (1118) of the first component (e.g., node 1106) and a shaft extending from the head (1116) through the hole (1114) in the first component (e.g., node 1106) and into the socket (1108) of the second component (e.g., node 1104).

In block 1408, form the pin to include an adhesive injection channel extending from the head through the shaft. The channel may be in communication with the hole the first component and a slot in the second component. For example, form the pin (1102) to include an adhesive injection channel (1110) extending from the head (1116) through the shaft. The channel (1110) may be in communication with the hole (1114) the first component (e.g., node 1106) and a slot (1122) in the second component (e.g., node 1104).

In block 1410, add an adhesive extending through the channel of the pin and into the hole of the first component and slot of the second component. For example, add an adhesive extending through the channel (1110) of the pin (1102) and into the hole (1114) of the first component (e.g., node 1106) and slot (1122) of the second component (e.g., node 1104).

In block 1412, form a seal between the first and second components to seal the adhesive in the hole of the first component and the slot of the second component. For example, form a seal (1124) between the first and second components (e.g., nodes 1106, 1104) to seal (1124) the adhesive in the hole (1114) of the first component (e.g., node 1106) and the slot (1122) of the second component (e.g., node 1104).

The previous description is provided to enable any person skilled in the art to practice the various aspects described herein. Various modifications to these exemplary embodiments presented throughout this disclosure will be readily apparent to those skilled in the art, and the concepts disclosed herein may be applied to 3-D printed components and fasteners. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   an additively manufactured first component; and a captive nut contained within the first component for interconnecting the first component to a second component, wherein at least one of the captive nut or at least a portion of a cavity for the captive nut is co-printed with the first component.

2. The apparatus of claim 1, wherein the captive nut comprises threads.

3. The apparatus of claim 2, wherein the threads are additively manufactured.

4. The apparatus of claim 1, wherein the captive nut floats within the first component.

5. The apparatus of claim 1, wherein the captive nut is prevented from rotating by the first component.

6. The apparatus of claim 1, further comprising an additively manufactured semi-spherical housing co-printed with the first component and the nut, wherein the nut is contained within the first component by the additively manufactured semi-spherical housing.

7. The apparatus of claim 1, further comprising a shim which together with the first component forms the cavity and allows the nut to move along an axial axis of the nut.

8. The apparatus of claim 7, wherein the shim is threaded to the first component.

9. The apparatus of claim 2, further comprising an insert having another portion of the cavity, wherein the first component is engaged with the insert and the nut is contained within the cavity.

10. The apparatus of claim 9, wherein the first component comprises an additively manufactured threaded portion and the insert comprises a threaded insert engaged with the threaded portion of the first component.

11. The apparatus of claim 9, further comprising a shim between a portion of the first component and the insert.

12. The apparatus of claim 2, further comprising an additively manufactured retainer plate which together with the first component forms the cavity, wherein the nut is contained within the cavity.

13. The apparatus of claim 12, wherein the retainer plate is configured to be slid within a slot within the first component to install the captive nut and the retainer plate is configured to slide out of the slot within the first component to retain the captive nut.

14. The apparatus of claim 12, wherein the retainer plate is rotatable between a first position to open the cavity to place the nut therein and a second position to lock the nut in the cavity.

15. The apparatus of claim 12, further comprising at least one of a captive lug or a captive stud configured to facilitate the closing and releasing of the retainer plate.

16. The apparatus of claim 2, wherein at least one of the first component and the second component comprises a node.

17. An apparatus, comprising:
a first additively manufactured component having a hole;
a second additively manufactured component having a socket; and
a pin having a head engaging a surface of the first component and a shaft extending from the head through the hole in the first component and into the socket of the second additively manufactured component, wherein the pin comprises an adhesive injection channel in communication with the hole in the first additively manufactured component and a slot in the second additively manufactured component.

18. The apparatus of claim 17, wherein the adhesive injection channel extends from the head through the shaft of the pin.

19. The apparatus of claim 18, further comprising an adhesive extending through the adhesive injection channel of the pin and into the hole of the first component and the slot of the second additively manufactured component.

20. The apparatus of claim 19, further comprising a seal between the first and second components to seal the adhesive in the hole of the first component and the slot of the second additively manufactured component.

21. An apparatus, comprising:
first and second panels;
a bolt having a head and a shaft extending from the head, wherein an adhesive injection channel that extends through the head is in communication with the first and second panels; and
a nut located at a distal end of the shaft;
wherein the first and seconds panels are sandwiched between the bolt and nut to interconnect the first and second panels.

22. The apparatus of claim 21, further comprising a component surrounding the shaft of the bolt.

23. The apparatus of claim 22, wherein the component extends into the first and second panels.

24. The apparatus of claim 23, wherein the first and second panels include holes and the component further comprises projections configured to form intermittent locating features.

25. The apparatus of claim 22, wherein the adhesive injection channel further extends through the component.

* * * * *

UNITED STATES PATENT AND TRADEMARK OFFICE
CERTIFICATE OF CORRECTION

PATENT NO. : 10,781,846 B2
APPLICATION NO. : 15/627103
DATED : September 22, 2020
INVENTOR(S) : Gunner et al.

Page 1 of 1

It is certified that error appears in the above-identified patent and that said Letters Patent is hereby corrected as shown below:

In the Claims

Column 11, Lines 24-27, Claim 9 Reads:
The apparatus of claim 2, further comprising an insert having another portion of the cavity, wherein the first component is engaged with the insert and the nut is contained within the cavity.

Should read:
The apparatus of claim 1, further comprising an insert having another portion of the cavity, wherein the first component is engaged with the insert and the nut is contained within the cavity.

Column 11, Lines 34-37, Claim 12 Reads:
The apparatus of claim 2, further comprising an additively manufactured retainer plate which together with the first component forms the cavity, wherein the nut is contained within the cavity.

Should read:
The apparatus of claim 1, further comprising an additively manufactured retainer plate which together with the first component forms the cavity, wherein the nut is contained within the cavity.

Column 12, Lines 1-3, Claim 16 Reads:
The apparatus of claim 2, wherein at least one of the first component and the second component comprises a node.

Should read:
The apparatus of claim 1, wherein at least one of the first component and the second component comprises a node.

Signed and Sealed this
Fifteenth Day of December, 2020

Andrei Iancu
*Director of the United States Patent and Trademark Office*